United States Patent
Nguyen et al.

(10) Patent No.: US 10,033,663 B2
(45) Date of Patent: *Jul. 24, 2018

(54) EVENT DRIVEN NETWORK SYSTEM

(71) Applicant: Dell Products L.P., Round Rock, TX (US)

(72) Inventors: Cuong Nguyen, Austin, TX (US); Rabah S. Hamdi, Spring, TX (US); Saikrishna M. Kotha, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 156 days.

This patent is subject to a terminal disclaimer.

(21) Appl. No.: 15/098,115

(22) Filed: Apr. 13, 2016

(65) Prior Publication Data

US 2016/0234133 A1    Aug. 11, 2016

Related U.S. Application Data

(63) Continuation of application No. 13/671,023, filed on Nov. 7, 2012, now Pat. No. 9,344,383.

(51) Int. Cl.
*H04L 12/18* (2006.01)
*H04L 12/935* (2013.01)
(Continued)

(52) U.S. Cl.
CPC .......... *H04L 49/30* (2013.01); *H04L 41/0809* (2013.01); *H04L 45/245* (2013.01); *H04L 49/25* (2013.01); *H04L 49/40* (2013.01)

(58) Field of Classification Search
CPC ...................................................... H04L 49/25
(Continued)

(56) References Cited

U.S. PATENT DOCUMENTS 6,754,219 B1 * 6/2004 Cain ..................... H04L 45/00
                                                          370/401
6,859,825 B1    2/2005 Williams
(Continued)

OTHER PUBLICATIONS

David Barnes, Basir Sakandar, "Cisco LAN Switching Fundamentals", Published by Cisco Press, First Printed Jul. 2004, pp. 1-312, ISBN:1-58705-089-7, (https://books.google.com/books?id=n4o1Z6jSNfMC&printsec=frontcover&vq=switch+fabric+cisco&source=gbs_ge_summary_r&cad=O#v=onepage&q=switch%20fabric%20cisco&f=false).

(Continued)

*Primary Examiner* — Guang W Li
(74) *Attorney, Agent, or Firm* — Haynes and Boone, LLP

(57) ABSTRACT

A network switch includes a plurality of internal ports, a plurality of external ports, an event handler, an action engine, and an event processor. The event handler detects an event and, in response, assembles a construct that includes event parameters. The action engine uses the construct to generate an event syntax. The event processor executes the event syntax to automatically configure the communication between the plurality of internal ports and the plurality of external ports. A first event may include the connection of a cable to a first external port and result in each of the plurality of internal ports communicating with the first external port. A second event may include the connection of a cable to a second external port and result in a first subset of internal ports communicating with the first external port and a second subset of internal ports communicating with the second external port.

20 Claims, 9 Drawing Sheets

(51) Int. Cl.
*H04L 12/947* (2013.01)
*H04L 12/24* (2006.01)
*H04L 12/709* (2013.01)
*H04L 12/931* (2013.01)

(58) Field of Classification Search
USPC .................................................. 370/255
See application file for complete search history.

(56) References Cited

U.S. PATENT DOCUMENTS

| | | | |
|---|---|---|---|
| 6,901,072 B1* | 5/2005 | Wong | H04L 12/4645 370/360 |
| 7,304,996 B1* | 12/2007 | Swenson | H04L 45/7453 370/229 |
| 7,689,704 B2 | 3/2010 | de Kerf | |
| 8,024,760 B2 | 9/2011 | Dickens et al. | |
| 8,099,710 B2* | 1/2012 | Hill | G06F 8/38 717/105 |
| 8,219,719 B1 | 7/2012 | Parry et al. | |
| 8,670,349 B2 | 3/2014 | Finn et al. | |
| 2002/0130787 A1 | 9/2002 | James, Jr. et al. | |
| 2005/0018621 A1 | 1/2005 | Dropps et al. | |
| 2005/0018627 A1 | 1/2005 | Cardei et al. | |
| 2006/0034284 A1* | 2/2006 | Saklecha | H04L 49/254 370/392 |
| 2007/0002883 A1 | 1/2007 | Edsall et al. | |
| 2007/0283364 A1* | 12/2007 | Deininger | G06F 9/542 719/318 |
| 2008/0037563 A1 | 2/2008 | Bernard | |
| 2008/0205377 A1* | 8/2008 | Chao | H04L 69/40 370/351 |
| 2008/0275975 A1* | 11/2008 | Pandey | H04L 49/40 709/223 |
| 2010/0280855 A1* | 11/2010 | Gupta | G06F 11/3006 709/223 |
| 2011/0072151 A1* | 3/2011 | Sharma | H04L 69/18 709/233 |
| 2012/0020373 A1 | 1/2012 | Subramanian et al. | |
| 2012/0147784 A1 | 6/2012 | Guo et al. | |
| 2013/0064137 A1* | 3/2013 | Santoso | H04L 49/70 370/254 |
| 2013/0088971 A1* | 4/2013 | Anantharam | H04L 49/10 370/236 |
| 2013/0235735 A1 | 9/2013 | Anantharam et al. | |
| 2013/0235763 A1 | 9/2013 | Anantharam et al. | |
| 2013/0304841 A1 | 11/2013 | Hummel et al. | |
| 2013/0308459 A1 | 11/2013 | Callan et al. | |
| 2014/0126424 A1 | 5/2014 | Nguyen et al. | |
| 2014/0219656 A1 | 8/2014 | Lawson et al. | |
| 2014/0313934 A1 | 10/2014 | Chung et al. | |
| 2014/0314099 A1 | 10/2014 | Dress | |
| 2015/0092593 A1 | 4/2015 | Kompella | |
| 2015/0147060 A1 | 5/2015 | Patel et al. | |

OTHER PUBLICATIONS

Cisco Systems, "Data Center Blade Server Integration Guide", Published by Cisco Systems 2006, pp. 1-118, (http://www.cisco.com/c/en/us/td/docs/solutions/Enterprise/Data_Center/DC_BladeServer/DCBladServ.pdf); see pp. 1-2, 1-3, Fig 1-1, Fig 1-2, p. 3-1, Fig 3-6, p. 3-11.

Gough, L., "Tech Flashback:2-port VGA PS/2 KVM Switch," Published Nov. 12, 2012, (http://gough_lui.com/2012/11/12-tech-flashback-2-port-vga-ps2-kvm-switch/).

* cited by examiner

EVENT DRIVEN NETWORK SYSTEM

CROSS-REFERENCE TO RELATED APPLICATIONS

This is a Continuation application to U.S. Utility application Ser. No. 13/671,023 filed Nov. 7, 2012, entitled "EVENT DRIVEN NETWORK SYSTEM," the disclosure of which is incorporated herein by reference in its entirety.

BACKGROUND

The present disclosure relates generally to information handling systems, and more particularly to event driven network devices for networking information handling systems.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs are typically networked together in network systems that allow the IHSs to communicate with each other over a network. For example, a racks of IHSs (e.g., server IHSs such as blades) may be connected with other racks of IHSs through a network to allow those IHSs to communicate and for other IHSs to access those IHSs over the network. Enhanced network device capabilities have led to more intelligent networking equipment that provides additional and sophisticated sets of features and properties. However, with the advent of these additional enhanced and sophisticated features, network equipment manageability and operational complexity has dramatically increased. Conventionally, network equipment management has been performed through human interface tools and software, which require experts in networking to manage and configure the network system, and limit the network system to a static configuration of the features and options available such that the network system has fixed operational behaviors that do not change in response to changing network conditions and properties.

Furthermore, network equipment configuration is subject to human errors such as, for example, mismatch of equipment settings or configurations, particularly in large data networks. Such errors can result in network operational issues, which can result in network downtime, loss of connectivity, loss of data, and a resulting loss of revenue generated by the network system.

Accordingly, it would be desirable to provide an improved network system.

SUMMARY

According to one embodiment, a network switch includes a chassis; a plurality of internal ports located on the chassis; a plurality of external ports located on the chassis; an event handler that is operable to detect an event and, in response, assemble a construct that includes a plurality of event parameters; an action engine coupled to the event handler and operable to use the construct to generate an event syntax; and an event processor coupled to the action engine, the plurality of internal ports, and the plurality of external ports, wherein the event processor is operable to execute the event syntax to automatically configure the operational mode and behavior of the network switch and the communication between the plurality of internal ports and the plurality of external ports.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
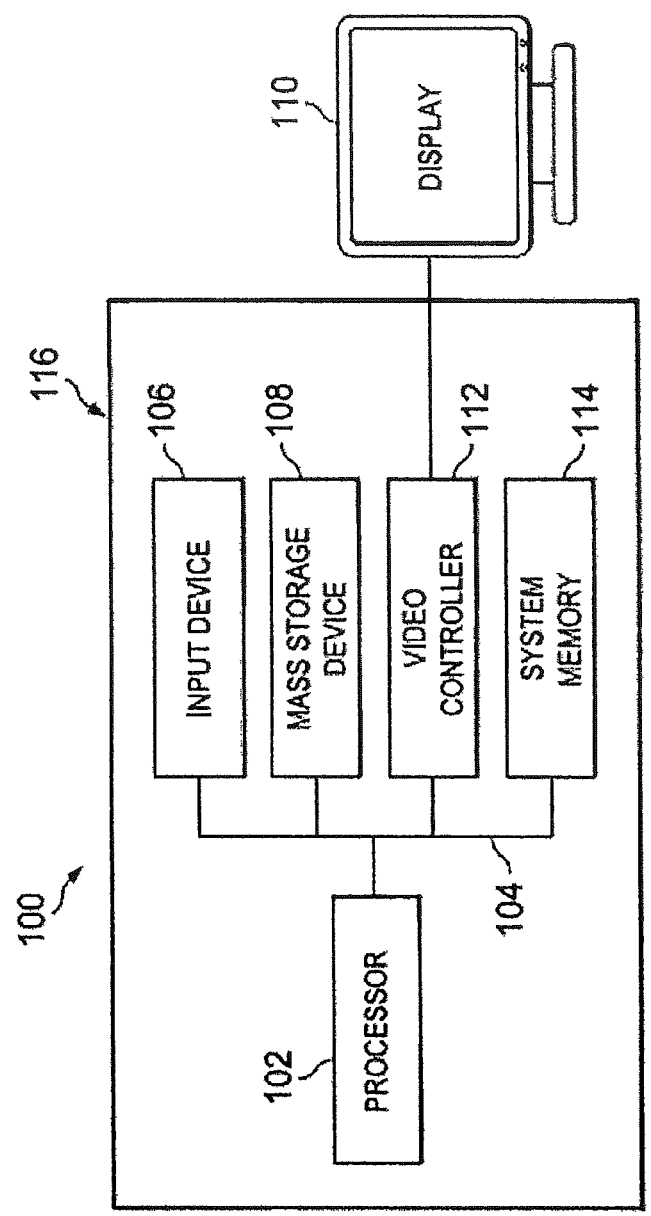
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
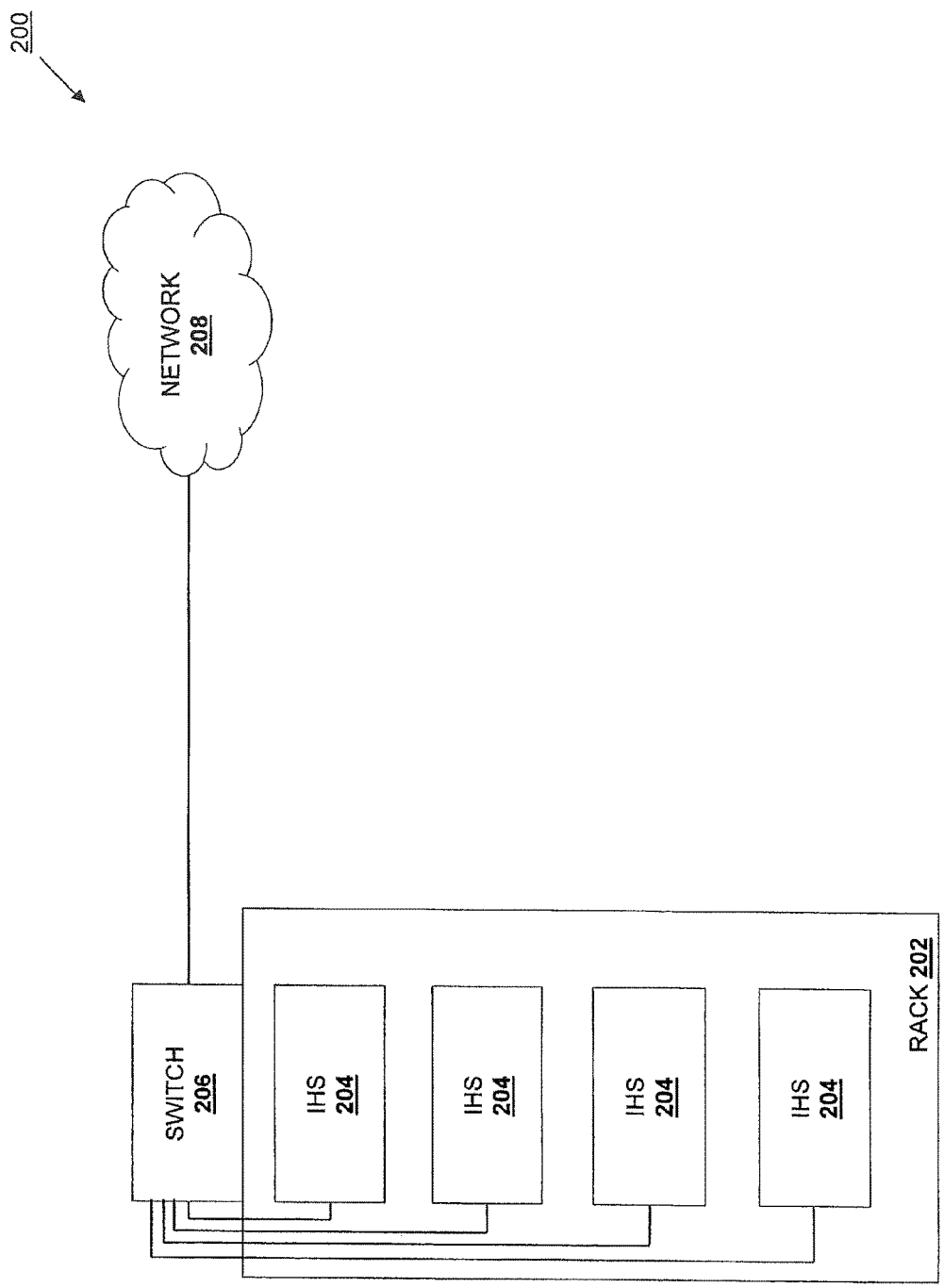
FIG. 2 is a schematic view illustrating an embodiment of a network switch coupled to each of a network and a plurality of the IHSs of FIG. 1 in a rack.

Referring now to FIG. 2, an embodiment of a networked system 200 is illustrated. In the illustrated embodiment, the networked system 200 include a rack 202 holding a plurality of IHSs 204 each coupled to a switch 206 that is coupled to a network 208. In an embodiment, any of the IHSs 204 may be the IHS 100, discussed above with reference to FIG. 1, and/or include some or all of the components of the IHS 100. In one example, each of the IHSs 204 are servers in a datacenter that are stored in the rack 202 and connected to a Top of Rack (ToR) switch 206 that is further connected to a storage area network (SAN) 208, either directly, or through intermediate equipment such as, for example, an aggregation switch and/or a variety of other intermediate equipment known in the art. One of skill in the art will recognize that, in the data center example, multiple racks storing IHSs may be connected to switches to couple the IHSs together and to a network. In another example, the IHSs 204 may be blade servers and the switch 206 may be a blade switch. While a few examples have been provided, the switch 206 and its associated functionality may be applied to a variety of different networking environments other than those mentioned while remaining within the scope of the present disclosure.

Figure 3:
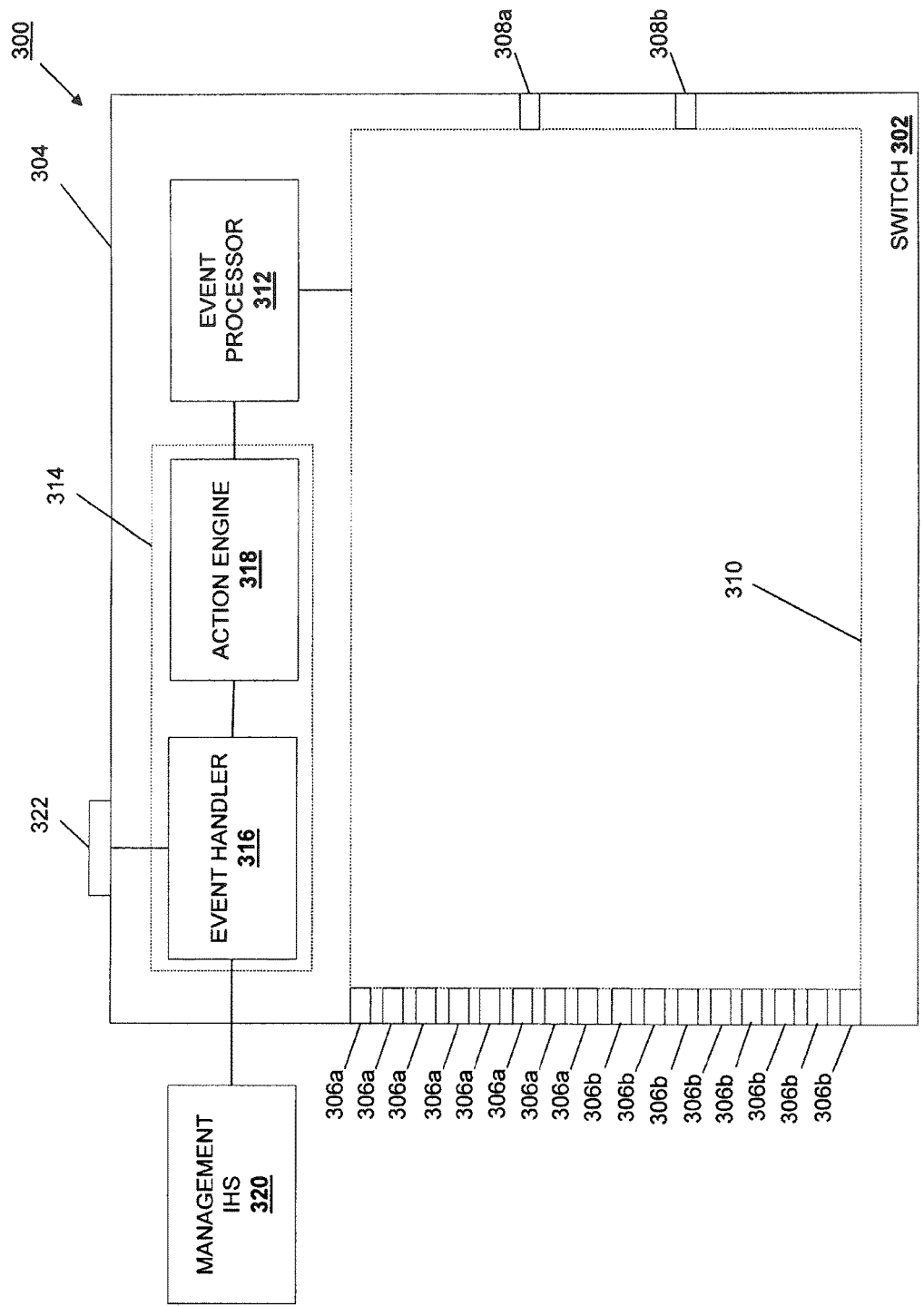
FIG. 3 is a schematic view illustrating an embodiment of the switch of FIG. 2.

Referring now to FIG. 3, an embodiment of a switching system 300, which may include the switch 206, discussed above with reference to FIG. 2, is illustrated. A switch 302 in the switching system 300 includes a chassis 304 that houses the components of the switch 302. A plurality of internal ports 306a and 306b are located on the chassis 304 and operable to be coupled with a plurality of external ports 308a and 308b through a connection fabric 310 (illustrated by the dashed box between the internal ports 306a, 306b and the external ports 308a, 308b), as discussed in further detail below. In an embodiment, the connection fabric 310 includes a variety of connection fabric features that are not illustrated for clarity of discussion but which would be recognized by one of skill in the art. In the discussion below, the internal ports 306a, 306b are described as ports on the switch 300 that connect to IHSs such as, for example, the IHSs 204 in the rack 202 of FIG. 2, while the external ports 308a, 308b are described as ports on the switch 300 that connect to the network such as, for example, the network 208 of FIG. 2. One of skill in the art will recognize this convention as referring to, for example, internal and external ports provided on blade switches, but in other embodiments of the present disclosure, the internal and external ports may be a variety of ports known in the art for connecting to a variety of different networked equipment known in the art. Furthermore, while sixteen internal ports 306a, 306b and two external ports 308a, 308b are illustrated for clarity of discussion, embodiments with different numbers of internal and external ports on the switch 300 are envisioned as falling within the scope of the present disclosure.

In an embodiment, the switch 300 may include some or all of the components of the IHS 100, discussed above with reference to FIG. 1. For example, in the illustrated embodiment, the switch 300 includes an event processor 312 that may be provided by the processor 102 of FIG. 1, a plurality of processors, and/or a variety of other processing elements known in the art. The event processor 312 is coupled to the connection fabric 310. The processor 102 and/or other processing elements in the switch 300 are coupled to a memory 314 (e.g., the system memory 114 illustrated in FIG. 1) that includes instruction that, when executed by the processor 102 and/or other processing elements, cause the processor 102 and/or other processing elements to provide an event handler 316 and an action engine 318 that are coupled to each other and the event processor 312. In the illustrated embodiment, a management IHS 320 is coupled to the event handler 316 (e.g., the management IHS 320 is operable to communicate with the event handler 316 provided by the processor 102 and/or other processing elements executing the instructions on the memory 314) through a direct connection to the switch 300, by a connection to the switch 300 through a network (e.g., the network 208 of FIG. 2), and/or in a variety of other manners known in the art. In the illustrated embodiment, a physical event switch 322 is included on the chassis 304 and coupled to the event handler 316 (e.g., the physical event switch 322 is operable to communicate with the event handler 316 provided by the processor 102 and/or other processing elements executing the instructions on the memory 314). While in the illustrated embodiment, both the management IHS 320 and the physical event switch 322 are coupled to the event handler 316, as discussed below, in some embodiments only the management IHS 320 or the physical event switch 322 may be coupled to the event handler 316.

Figure 4A:
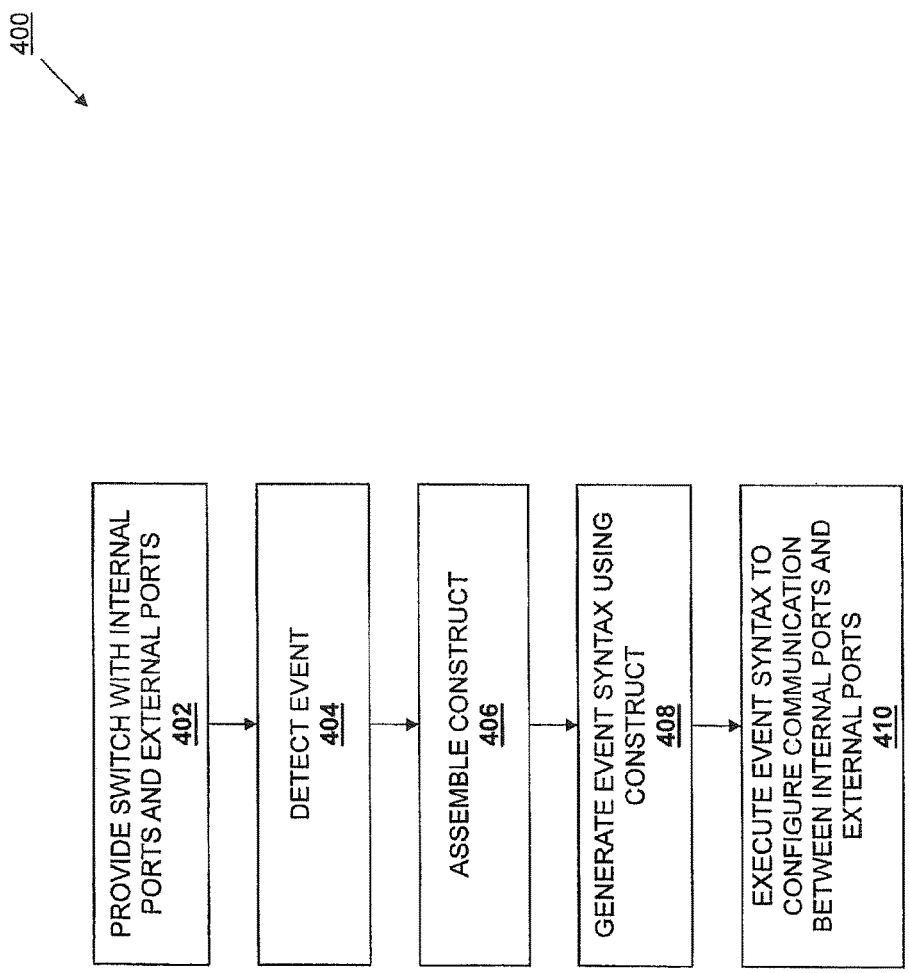
FIG. 4a is a flow chart illustrating an embodiment of a method for configuring a network switch.

Referring now to FIG. 4a, a method 400 for configuring a switch is illustrated. As discussed in further detail below, the switch 206/300 illustrated in FIGS. 2 and 3, along with the method 400 illustrated in FIG. 4a, provide an event-driven architecture based network device that operates in a self-configuring manner based on events and conditions that allow the network device to function in different modes of operation without being managed by a network administrator or otherwise requiring the intervention of a user or operator. The switch 206/300 may have multiple modes of operation that each provide for different functionality of the switch 206/300.

In one example, the switch 206/300 maintains a flexible list of supported operation modes in a non-volatile/persistent memory, and those operation modes may be set via hardware or software, for example, using physical toggle switches, key pads accessible to a user, displays, chassis management consoles, remote access controllers, life cycle controllers, via management protocols (e.g., Link Layer Discovery Protocol (LLDP)/Cisco Discovery Protocol (CDP), Simple Network Management Protocol (SNMP), a Wireless Network Manager (WNM), Web Services Management Protocol (WSMAN), and/or using a variety of other management protocols known in the art). Furthermore, operation modes may be pushed to the switch 206/300 or pulled from a management device (e.g., a Dynamic Host Configuration Protocol (DHCP) server, a Remote Authentication Dial In User Server (RADIUS) server, and/or any other distributed client/server management network.) In some embodiments, custom operation modes may be configured or determined by a user or network administrator.

The event driven architecture discussed below enables intelligent and unmanaged networking devices by detecting events, which may be generated internally or externally to the switch 206/300, using hardware and/or software. Detected events are identified and then actions are taken internally or externally to configure the switch to fulfill the requirements of the event by generating sequences of operations that are carried out in the switch 206/300 to, for example, configure the communication of ports that is required for the desired operations. For example, as discussed in further detail below, an event may be detected by the event handler 316 which, in response, assembles a construct that conveys the event description code and event parameters. The construct is provided to the action engine 318 to generate the syntax "script" for the construct, and that script is provided to the event processor 312 for execution such that the switch 206-300 is configured for a desired mode of operation for that event.

Referring now to FIGS. 2, 3, and 4a, the method 400 begins at block 402 where a switch with internal ports and external ports is provided. In an embodiment, the switch 300 including the internal ports 306, 306b and external ports 308a, 308b of FIG. 3 is provided, for example, as the switch 206 located on the rack 202 of FIG. 2. In the embodiment discussed below, a plurality of IHSs (e.g., the IHSs 204 of FIG. 2) are coupled to the switch 206/300 by, for example, coupling each IHS 204 to a respective internal port 306a, 306b on the switch 206/300 using cabling or other coupling devices known in the art. Thus, in the illustrated embodiment, the method 400 may begin with the switch 206/300 coupled to a plurality of IHSs through its internal ports 306a, 306b. However, as discussed below, the switch 206/300 may begin the method 400 without being coupled to any IHSs or other devices through its internal ports 306a, 306b and external ports 308a, 308b (and may configure itself similarly as discussed below in response to the coupling of IHSs to those ports) while remaining within the scope of the present disclosure.

The method 400 then proceeds to block 404 where an event is detected. In an embodiment, the event handler 316 is operable to detect the event at block 404. In one embodiment, the physical event switch 322 is operable may be manipulated by a user in order to create an event that is detected by the event handler 316. For example, the physical event switch 322 may include a plurality of settings (e.g., settings 00 to 99) that may be set by a user and that each creates a different event that will provide for a different mode of operation of the switch 300, as discussed below. In another embodiment, the management IHS 320 may provide the event that is detected by the event handler 316. For example, the management IHS 320 may be, for example, a DHCP server, a RADIUS server, and/or a variety of other centralized management servers known in the art, and the management IHS 320 may provide mode operation as part of the setting of the IP address of the switch 206/300. Thus, in some embodiments, using Application Programming Interfaces (APIs) of the switch 206/300, customized modes of operations of the switch 206/300 may be provided to the switch. For example, at block 404, as part of the query/response establishing the IP address of the switch 206/300, the management IHS 320 may provide as the event the mode number (similar to the settings 00-99 discussed above with reference to the physical event switch 322) and APIs for execution by the switch 206/300. In yet another example, an event detected by the event handler 316 at block 404 may include plugging a cable into one or more of the ports, discussed in further detail below.

Figure 4B:
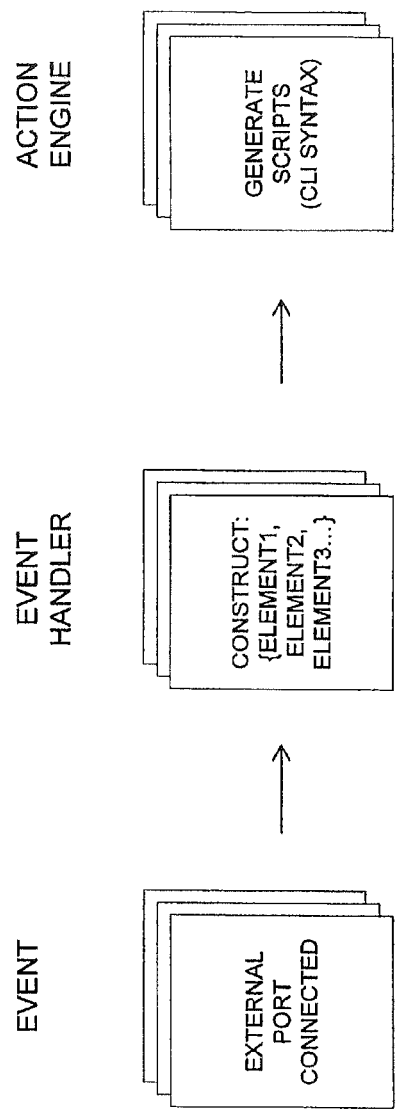
FIG. 4b is a flow illustrating an embodiment of the assembly of a construct from a detected event and its use in generating a script.
Figure 4C:
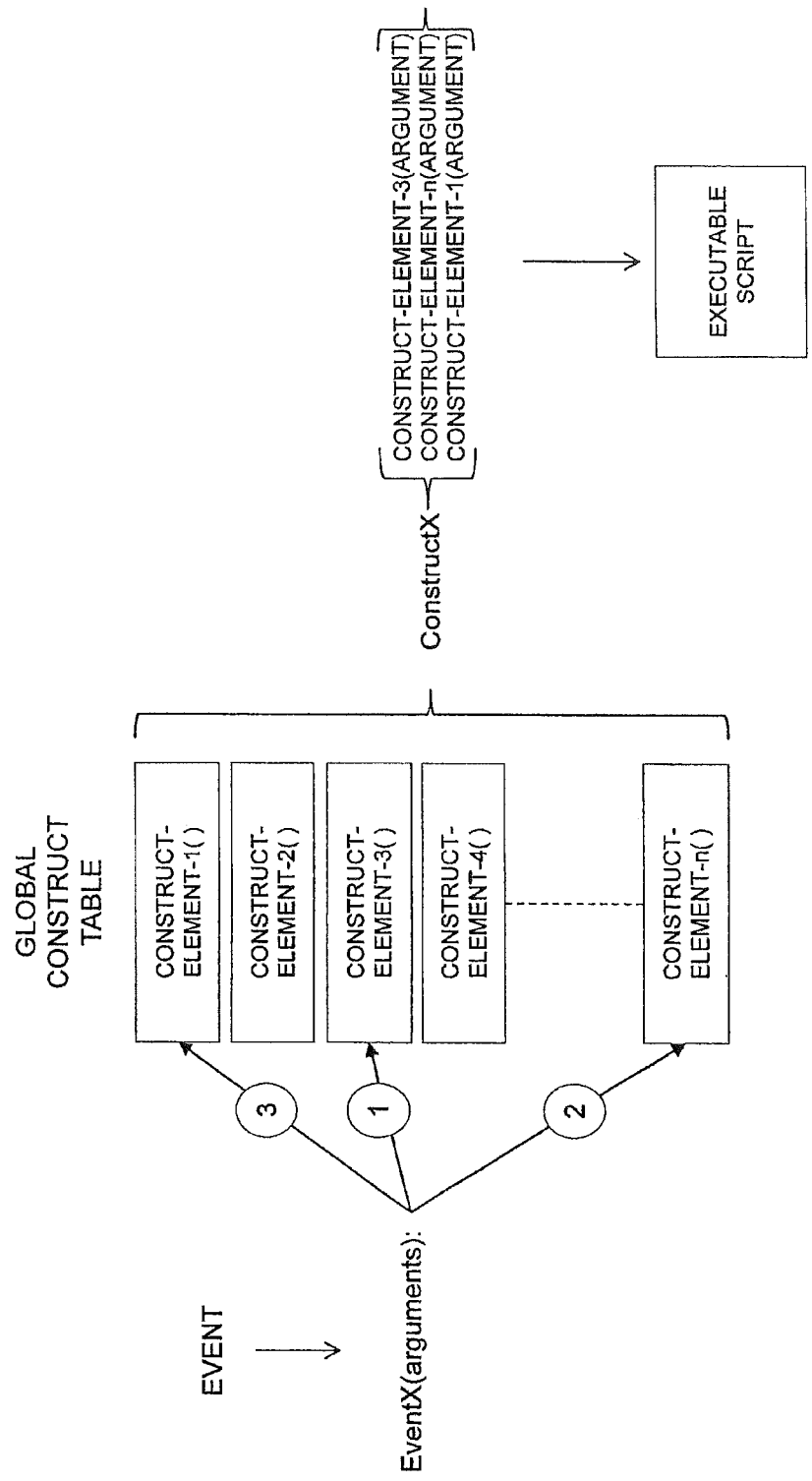
FIG. 4c is a schematic view illustrating an embodiment of the assembly of a construct from a detected event and its use in generating a script.

Referring now to FIGS. 3, 4a, 4b, and 4c, the method 400 then proceeds to block 406 where a construct is assembled. FIG. 4b illustrates an event detected at block 404 that includes the connection of a cable to an external port on the switch 206/300. In response to the connection of the cable to an external port, as illustrated in FIG. 4c, an event that includes a set of arguments that specify the particulars of the event is generated and detected. The event handler 316 then assembles a construct including a plurality of elements (e.g., element1, element2, element3, etc. in FIG. 4b) that may be provided as predefined tabulated entries that correspond to a specific Common Language Infrastructure (CLI) command that is operable to be used by the event processor 312 to configure the switch 206/300. For example, referring to FIG. 4c, a Global Construct Table may be provided that includes a plurality of construct elements 1-n that, in response to the detection of particular events including particular arguments, may be selected as elements of the construct being assembled. The event handler 316 will create a data structure of one or more of the construct element entries that are selected based on the event and its arguments. Collections of multiple construct elements may then be assembled into a set of operations that provide a script or macro. In an embodiment, elements selected to assemble a construct may include elements that convey the event description code and event parameters such as, for example, port numbers, configuration parameters, specific commands and APIs, values, etc.

The method then proceeds to block 408 where an event syntax is generated using the construct assembled in block 406. In an embodiment, at block 408, the event handler 316 passes the construct assembled at block 406 to the action engine 318 such that the action engine 318 can generate an event syntax using that construct. For example, a pointer to the construct element structure discussed above may be passed to the action engine 318 from the event handler 316. The action engine 318 may then translate the construct elements to generate APIs or CLI syntax scripts, as illustrated in FIG. 4b. While in such an implementation, it may be simpler to generate a script that is based on existing CLI commands triggered from an event, in some embodiments a "tighter" integration with the switch operating system (OS) is provided by directly calling into low level APIs in the switch OS directly and bypassing the CLI layer by having the action engine 318 translate the construct elements into a generic script format that is independent of switch CLI commands (such as specific APIs.) One of skill in the art will recognize that the former may be simpler to implement but limited to the capabilities of the CLI, while the second is more powerful but harder to implement. As illustrated in FIG. 4c, a particular event may be detected that is associated with particular arguments that result in the selection of particular construct elements for the construct being assembled at block 406. The elements of that construct are used by the action engine 318 to generate a script with an event syntax that is executable by the event processor 312, discussed below.

The method 400 then proceeds to block 410 where the event syntax generated in block 408 is executed to configure the communication between the internal ports and the external ports on the switch. In an embodiment, the execution of the script including the event syntax generated in block 408 that causes the event processor 312 to modify forwarding logic over the connection fabric 310 to configure the communication between the internal ports 306a, 306b and the external ports 308a, 308b. For example, a pointer to the script may be passed from the action engine 218 to the event processor 312, and the event processor 312 may then translate the script to hardware dependent CLI commands for execution. Thus, in an embodiment, the script and event syntax may be independent of the underlying hardware or vendor CLI. For example, it is possible to put a translation layer in between the application layer and the underlying CLI or switch specific API so that a single application layer can be used with different switch operating systems or CLIs, which allows for isolation from the CLI. In some embodiments, the event processor 312 may send the contents of the script to an external entity (e.g., through the network 208) such that the external entity may act upon the script. In some embodiments, the event processor 312 may undertake other activities in addition to the execution of the script, including but not limited to handling and reporting errors and misconfigurations to the management IHS 320. A plurality of different examples of configured communications between the internal ports 306a, 306b and external ports 308a, 308b of the switch 206/300 are provided below, but those examples should not be interpreted as limiting, as any configuration of communications between any ports (and in response in any detected events) are envisioned as falling within the scope of the present disclosure.

Figure 4D:
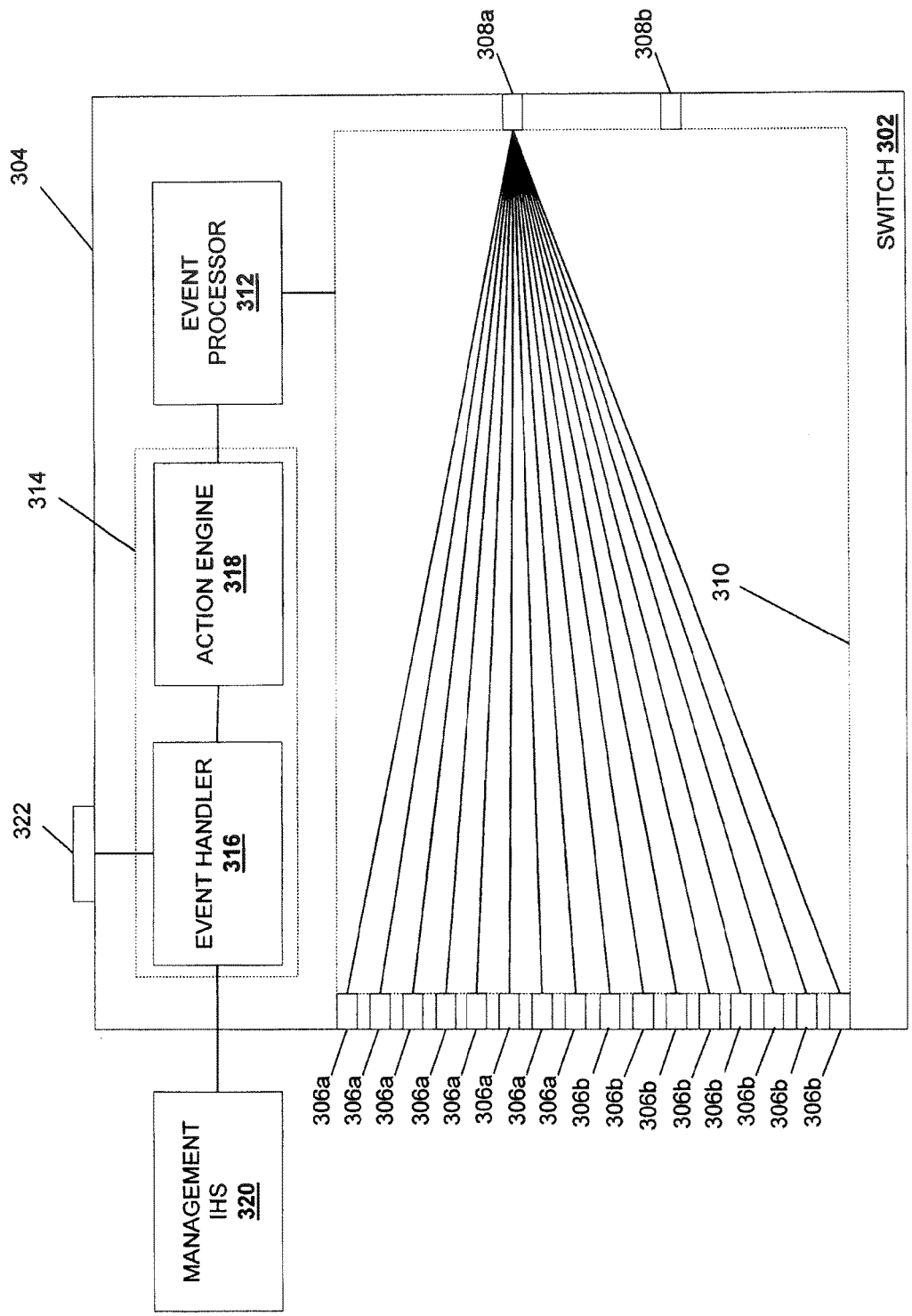
FIG. 4d is a schematic view illustrating an embodiment of the switch of FIG. 3 with the communication of the internal ports and external ports configured according to a first mode of operation and in response to at least one event.

Referring now to FIG. 4d, in one embodiment, the communication between the internal ports 306a, 306b and the external ports 308a, 308b may be configured such that each of the internal ports 306a, 306b communicates with the external port 308a. For example, the physical event switch 322 may include a mode setting (e.g., "00") that operates to "pin all user ports to uplink-1", and in response to being provided (e.g., the physical setting of the physical event switch by a user) with that mode setting (i.e., an event), the connection fabric 310 is configured such that each of the internal ports 306a, 306b (e.g., "user ports") communicates with the external port 308a (e.g., "uplink-1"). In some examples, such a mode setting may configure any internal ports 306a, 306b to communicate with the external port 308a regardless of whether a cable is connected to external port 308b. Similarly, the management IHS 320 may provide a mode setting (e.g., over the network 208) in which the connection fabric 310 is configured such that each of the internal ports 306a, 306b communicates with the external port 308a substantially as discussed above.

In another example, upon being powered on, the switch 206/300 may be initialized into a default configuration in which jumbo frames are enabled, all ports are put into trunk mode, and/or having a variety of other configuration details known in the art. With an IHS coupled to each respective internal port 306a, 306b, a cable may be plugged into the external port 308a, providing an external port 308a link-up event that causes the connection fabric 310 to be configured such that each of the internal ports 306a, 306b communicates with the external port 308a. In addition, the switch 206/300 may be automatically configured to stay in a "willing mode" and to auto-configure the Priority Flow Control (PFC) settings received on the external port 308a (and to reflect the same on the internal ports 306a, 306b) in the event Data Center Bridging Exchange (DCBX) protocol packets are received. Furthermore, the switch 206/300 may be configured to perform link tracking of the external port 308a to the internal ports 306a, 306b. In an embodiment, the configuration of the switch 206/300 may include "bringing down" or otherwise disabling the internal ports 306a, 306b if the external port 308a is brought down or otherwise disabled. In addition, the switch may be configured to learn the source Media Access Control (srcMAC) address on the internal ports 306a, 306b for de-multiplexing packets received on the external port 308a and sent to the internal ports 306a, 306b. Thus, for a first mode of operations (e.g., "Pinning Mode 1"), when a cable is connected to the external port 308a but not to the external port 308b, each of the internal ports 306a, 306b may be configured to communicate with the external port 308a, along with a number of other configuration details being applied to the switch 206/300.

Figure 4E:
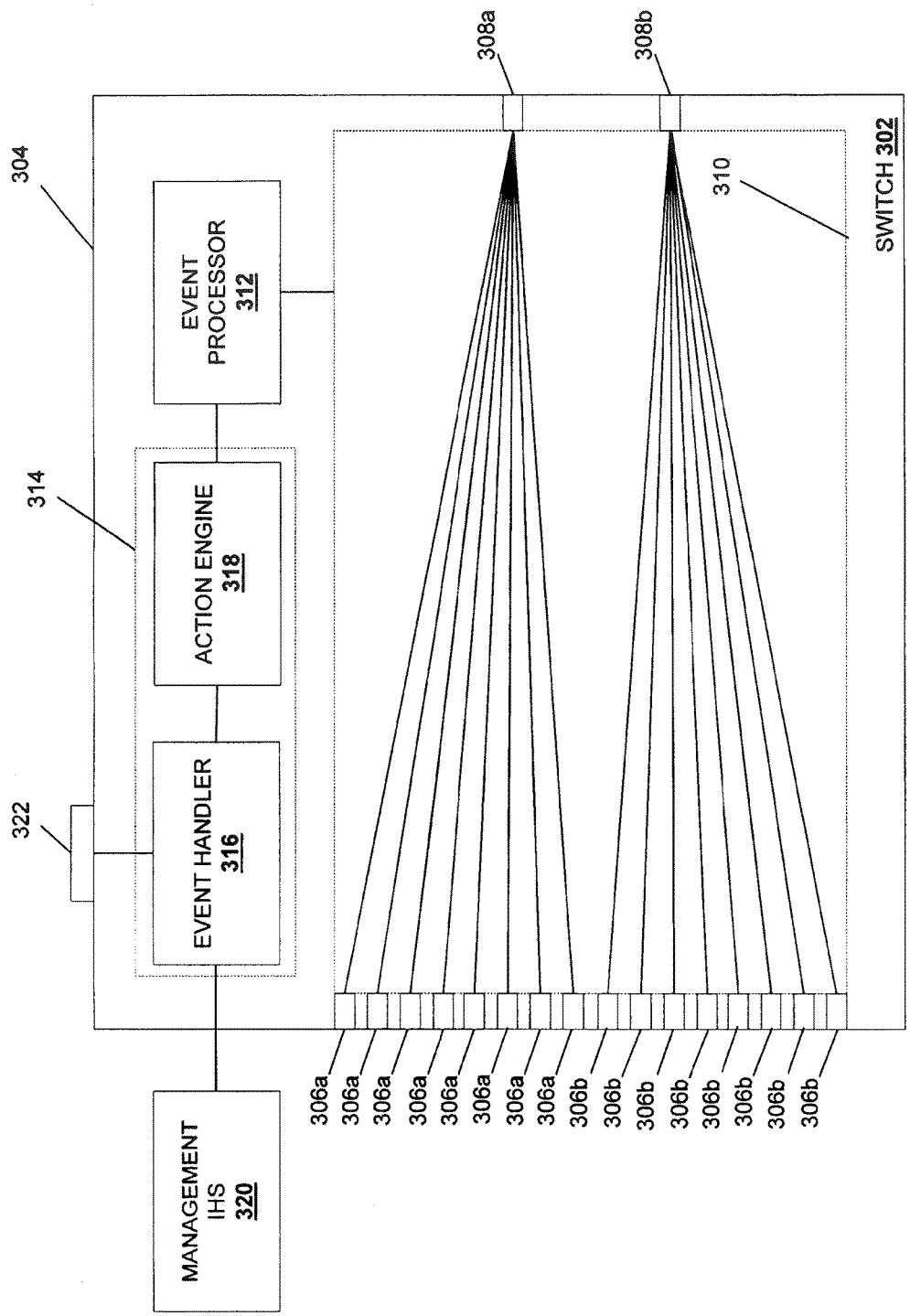
FIG. 4e is a schematic view illustrating an embodiment of the switch of FIG. 3 with the communication of the internal ports and external ports configured according to a second mode of operation and in response to at least one event.

Referring now to FIGS. 4d and 4e, in one embodiment, the communication between the internal ports 306a, 306b and the external ports 308a, 308b may be configured such that each of the internal ports 306a communicates with the external port 308a and each of the internal ports 306b communicates with the external port 308b. For example, the physical event switch 322 may include a mode setting (e.g., "01") that operates to "pin all user ports to uplink-1 if uplink-1 is the only uplink with a cable connected to it, while pinning half of the user ports to uplink-1 and half of the user ports to uplink-2 if cables are connected to both uplinks". In response to being provided (e.g., the physical setting of the physical event switch by a user) with that mode setting (i.e., an event), the connection fabric 310 is configured such that each of the internal ports 306a, 306b (e.g., "user ports") communicates with the external port 308a (e.g., "uplink-1") if a cable is connected to the external port 308a but not to external port 308b, while the connection fabric 310 is configured such that the internal ports 306a (e.g., "user ports") communicate with the external port 308a (e.g., "uplink-1") and the internal ports 306b (e.g., "user ports") communicate with the external port 308b (e.g., "uplink-2") if a cable is connected to each of the external port 308a and the external port 308b. Similarly, the management IHS 320 may provide a mode setting in which the connection fabric 310 is configured such that each of the internal ports 306a, 306b communicates with the external port 308a if a cable is connected to the external port 308a but not to external port 308b, while the connection fabric 310 is configured such that the internal ports 306a communicate with the external port 308a and the internal ports 306b communicate with the external port 308b if a cable is connected to each of the external port 308a and the external port 308b.

In another example, upon being powered on, the switch 206/300 may be initialized into a default configuration in which jumbo frames are enabled, all ports are put into trunk mode, and/or having a variety of other configuration details known in the art. With an IHS coupled to each respective internal port 306a, 306b, a cable may be plugged into the external port 308a, providing an external port 308a link-up event that causes the connection fabric 310 to be configured such that each of the internal ports 306a, 306b communicates with the external port 308a. In addition, the switch 206/300 may be automatically configured to stay in a "willing mode" and to auto-configure the Priority Flow Control (PFC) settings received on the external port 308a (and to reflect the same on the internal ports 306a, 306b) in the event Data Center Bridging Exchange (DCBX) protocol packets are received. Furthermore, the switch 206/300 may be configured to perform link tracking of the external port 308a to the internal ports 306a, 306b. In an embodiment, the configuration of the switch 206/300 may include "bringing down" or otherwise disabling the internal ports 306a, 306b if the external port 308a is brought down or otherwise disabled.

A cable may then be plugged into the external port 308b, providing an external port 308b link-up event that causes the connection fabric 310 to be configured such that each of the internal ports 306a communicates with the external port 308a and each of the internal ports 306b communicates with the external ports 308b. In addition, the switch 206/300 may be automatically configured to stay in a "willing mode" and to auto-configure the Priority Flow Control (PFC) settings received on the external port 308b (and to reflect the same on the internal ports 306b) in the event Data Center Bridging Exchange (DCBX) protocol packets are received. Furthermore, the switch 206/300 may be configured to perform link tracking of the external port 308b to the internal ports 306b. In an embodiment, the configuration of the switch 206/300 may include "bringing down" or otherwise disabling the internal ports 306b if the external port 308b is brought down or otherwise disabled.

In addition, the switch may be configured to learn the source Media Access Control (srcMAC) address on the internal ports 306a, 306b for de-multiplexing packets received on the external port 308a and sent to the internal ports 306a and for de-multiplexing packets received on the external port 308b and sent to the internal ports 306b. Thus, for a second mode of operations (e.g., "Pinning Mode 2"), when a cable is connected to both the external ports 308a and the external port 308b, the internal ports 306a may be configured to communicate with the external port 308a and the internal ports 306b may be configured to communicate with the external port 308b, along with a number of other configuration details being applied to the switch 206/300.

Figure 4F:
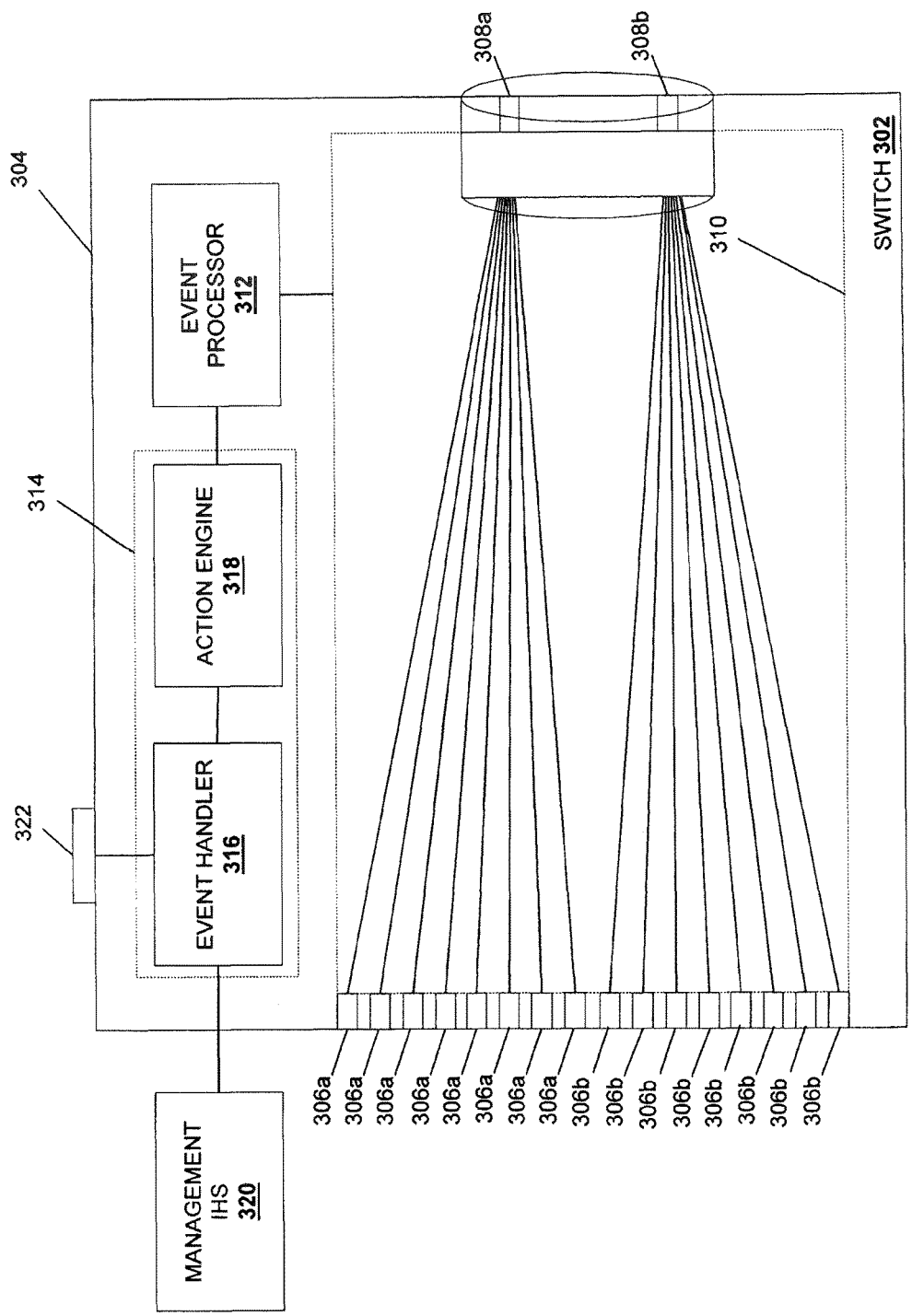
FIG. 4f is a schematic view illustrating an embodiment of the switch of FIG. 3 with the communication of the internal ports and external ports configured according to a third mode of operation and in response to at least one event.

Referring now to FIG. 4f, in one embodiment, the communication between the internal ports 306a, 306b and the external ports 308a, 308b may be configured such that a Link Aggregation Group (LAG) is created with the external ports 308a, 308b and used to communicate with each of the internal ports 306a, 306b. For example, the physical event switch 322 may include a mode setting (e.g., "02") that operates to "create a LAG out of all available uplinks". In response to being provided (e.g., the physical setting of the physical event switch by a user) with that mode setting (i.e., an event), each of the external ports 308, 308b are put into a LAG and the connection fabric 310 is configured such that each of the internal ports 306a, 306b communicates with the LAG. Similarly, the management IHS 320 may provide a mode setting that causes the external ports 308a, 308b to beput into a LAG and the connection fabric 310 to be configured such that each of the internal ports 306a, 306b communicate with the LAG.

In another example, upon being powered on, the switch 206/300 may be initialized into a default configuration in which jumbo frames are enabled, a LAG is configured for the external ports 308a, 308b, all ports and the LAG are put into trunk mode, link tracking is configured for the LAG to the internal ports 306a, 306b, and/or having a variety of other configuration details known in the art. With an IHS coupled to each respective internal port 306a, 306b, a cable may be plugged into the external port 308a, providing an external port 308a link-up event that causes the external port 308a to be put into the LAG, and the connection fabric 310 to be configured such that each of the internal ports 306a, 306b communicates with the LAG. In addition, the switch 206/300 may be automatically configured to stay in a "willing mode" and to auto-configure the Priority Flow Control (PFC) settings received on the external port 308a (and to reflect the same on the internal ports 306a, 306b) in the event Data Center Bridging Exchange (DCBX) protocol packets are received. In an embodiment, the configuration of the switch 206/300 may include "bringing down" or otherwise disabling the internal ports 306a, 306b if the LAG is brought down or otherwise disabled.

A cable may then be plugged into the external port 308b, providing an external port 308b link-up event that causes the external port 308b to be put into the LAG, and the external port 308a configurations settings discussed above for the external port 308a to be replicated for the external port 308b. The LAG may then be configured to load share the traffic from the internal ports 308a, 308b (e.g., between the external ports 308a, 308b in the LAG). In an embodiment, the configuration of the switch 206/300 may include "bringing down" or otherwise disabling the internal ports 306a, 306b if the LAG is brought down or otherwise disabled.

In addition, the switch may be configured to learn the source Media Access Control (srcMAC) address on the internal ports 306a, 306b for de-multiplexing packets received on the LAG and sent to the internal ports 306a, 306b. Thus, for a third mode of operations (e.g., "Load Balancing Mode 1"), a LAG group is created for the external ports 308a, 308b and when a cable is connected to either or both the external port 308a and the external port 308b, the internal ports 306a and 306b may be configured to communicate with the LAG.

Thus, a system and method have been described that includes a network device that self configures based on events and conditions such that the network device will function in different modes of operation. Such systems and methods pave the path to the emergence of new generations of intelligent and unmanaged networking equipment that does not require user or operator interventions.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A networking device, comprising:
   a chassis;
   a plurality of internal ports that are accessible on the chassis;
   a plurality of external ports that are accessible on the chassis;
   a connection fabric that is housed in the chassis and that couples the plurality of internal ports to the plurality of external ports;
   a first subsystem that is housed in the chassis and that is coupled to the plurality of external ports, wherein the first subsystem is configured to detect a first event that is associated with a first external port of the plurality of external ports;
   a second subsystem that is coupled to the first subsystem and that is configured, in response to the detection of the first event by the first subsystem, to generate a first command set; and a third subsystem that is coupled to the second subsystem and the connection fabric, wherein the third subsystem is configured to:
  execute the first command set to automatically configure the connection fabric such that at least one of the plurality of internal ports communicate through the connection fabric with the first external port; and
  automatically define data transmission characteristics between the at least one of the plurality of internal ports and the first external port.

2. The networking device of claim 1, further comprising:
a physical controller that is included on the chassis and coupled to the first subsystem, wherein the first subsystem is configured to detect the first event in response to a setting of the physical controller.

3. The networking device of claim 1, further comprising:
a management system coupled to the first subsystem by a network, wherein the first subsystem is configured to detect the first event in response to a communication received from the management system over the network.

4. The networking device of claim 1, wherein the first subsystem is configured to detect the first event in response to detecting a connection to the first external port.

5. The networking device of claim 1, wherein:
the first subsystem is configured to detect a second event that is associated with a second external port of the plurality of external ports;
the second subsystem is configured, in response to the detection of the second event by the first subsystem, to generate a second command set; and
the third subsystem is configured to:
  execute the second command set to automatically configure the connection fabric such that at least one of the plurality of internal ports communicate through the connection fabric with the first external port and at least one of the plurality of internal ports communicate through the connection fabric with the second external port;
  automatically define data transmission characteristics between the at least one of the plurality of internal ports and the first external port; and
  automatically define data transmission characteristics between the at least one of the plurality of internal ports and the second external port.

6. The networking device of claim 5, wherein the first subsystem is configured to detect the second event in response to detecting a connection to the second external port of the plurality of external ports subsequent to detecting a connection to the first external port of the plurality of external ports.

7. The networking device of claim 1, wherein:
the first subsystem is configured to detect a second event that is associated with a second external port of the plurality of external ports;
the second subsystem is configured, in response to the detection of the second event by the first subsystem, to generate a second command set; and
the third subsystem is configured to:
  execute the second command set to automatically configure the connection fabric to aggregate the first external port and the second external port to create a link aggregation group (LAG) such that at least one of the plurality of internal ports communicate through the connection fabric with the LAG; and
  automatically define data transmission characteristics between the at least one of the plurality of internal ports and the LAG.

8. An information handling system (IHS) comprising:
a plurality of internal ports;
a plurality of external ports;
a connection fabric that is configurable to provide connections between the plurality of internal ports and the plurality of external ports;
a processing system coupled to the plurality of external ports and the connection fabric; and
a memory system that is coupled to the processing system and that includes instructions that, when executed by the processing system, cause the processing system to perform operations including:
  detecting a first event that is associated with a first external port of the plurality of external ports;
  generating, in response to detecting the first event, a first command set;
  executing the first command set to automatically configure the connection fabric such that at least one of the plurality of internal ports communicate through the connection fabric with the first external port; and
  automatically defining data transmission characteristics between the at least one of the plurality of internal ports and the first external port.

9. The IHS of claim 8, further comprising:
a physical controller coupled to the processing system, wherein the operations include detecting the first event in response to a setting of the physical controller.

10. The IHS of claim 8, further comprising:
a network coupled to the processing system, wherein the operations include detecting the first event in response to a communication received from a management system over the network.

11. The IHS of claim 8, wherein the operations include detecting the first event in response to detecting a connection to the first external port.

12. The IHS of claim 8, wherein the operations include:
detecting a second event that is associated with a second external port of the plurality of external ports;
generating, in response to detecting the second event, a second command set;
executing the second command set to automatically configure the connection fabric such that at least one of the plurality of internal ports communicate through the connection fabric with the first external port and at least of the plurality of internal ports communicate through the connection fabric with the second external port;
automatically defining data transmission characteristics between the at least one of the plurality of internal ports and the first external port; and
automatically defining data transmission characteristics between the at least one of the plurality of internal ports and the second external port.

13. The IHS of claim 12, wherein the operations include detecting the second event in response to detecting a connection to the second external port of the plurality of external ports subsequent to detecting a connection to the first external port of the plurality of external ports.

14. The IHS of claim 13, wherein the operations include:
detecting a second event that is associated with a second external port of the plurality of external ports;
generating, in response to detecting the second event, a second command set;
executing the second command set to automatically configure the connection fabric to aggregate the first external port and the second external port to create a link aggregation group (LAG) such that at least one of the plurality of internal ports communicate through the connection fabric with the LAG; and automatically defining data transmission characteristics between the at least one of the plurality of internal ports and the LAG.

15. A method for configuring a network switch, comprising:

detecting a first event that is associated with a first external port of a plurality of external ports on a device;

generating, in response to detecting the first event, a first command set;

executing the first command set to automatically configure a connection fabric between the first external port and a plurality of internal ports on the device such that at least one of the plurality of internal ports communicate through the connection fabric with the first external port; and automatically defining data transmission characteristics between the at least one of the plurality of internal ports and the first external port.

16. The method of claim 15, further comprising:

detecting, in response to a setting of a physical controller on the device, the first event.

17. The method of claim 15, further comprising:

detecting, in response to a communication received from a management system over a network, the first event.

18. The method of claim 15, further comprising:

detecting, in response to detecting a connection to the first external port, the first event.

19. The method of claim 15, further comprising:

detecting a second event that is associated with a second external port of the plurality of external ports;

generating, in response to detecting the second event, a second command set;

executing the second command set to automatically configure the connection fabric such that at least one of the plurality of internal ports communicate through the connection fabric with the first external port and at least of the plurality of internal ports communicate through the connection fabric with the second external port;

automatically defining data transmission characteristics between the at least one of the plurality of internal ports and the first external port; and automatically defining data transmission characteristics between the at least one of the plurality of internal ports and the second external port.

20. The method of claim 19, further comprising:

detecting, in response to detecting a connection to the second external port subsequent to detecting a connection to the first external port, the second event.

* * * * *